Patented Jan. 21, 1936

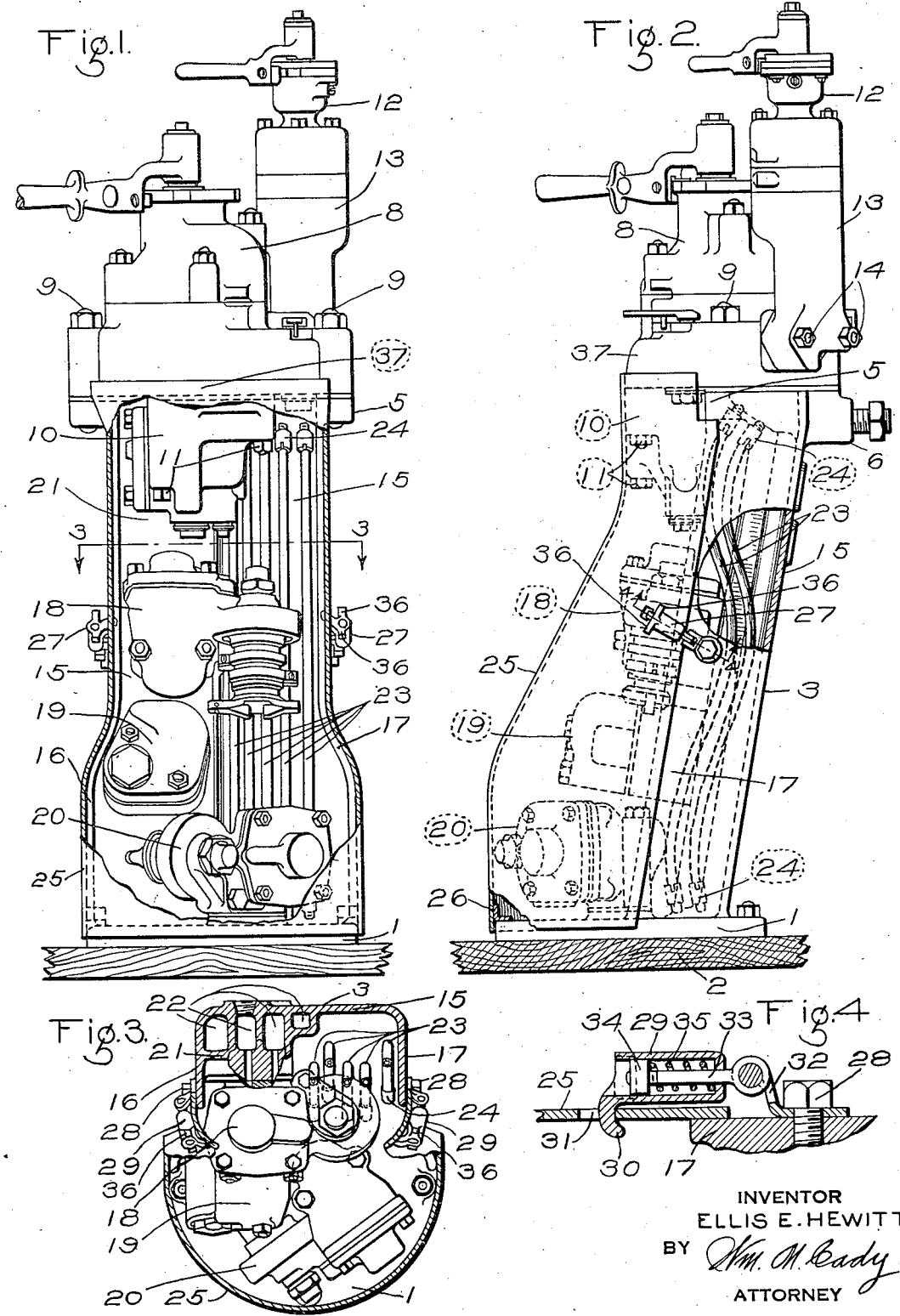

2,028,606

UNITED STATES PATENT OFFICE 2,028,606

PEDESTAL BRAKE VALVE DEVICE

Ellis E. Hewitt, Edgewood, Pa., assignor to The Westinghouse Air Brake Company, Wilmerding, Pa., a corporation of Pennsylvania Application October 20, 1934, Serial No. 749,220

17 Claims. (Cl. 303—90)

This invention relates to fluid pressure brakes, and more particularly to the mounting arrangement of certain of the valve devices which make up the fluid pressure brake equipment for a locomotive.

The usual locomotive brake equipment includes an engineer's automatic brake valve device and independent brake valve device, which are generally mounted on a bracket carried by the locomotive cab or boiler, a feed valve device for supplying fluid at the reduced pressure adapted to be carried in the brake pipe of a fluid pressure brake system, a reducing valve device adapted to supply fluid at reduced pressure for use in effecting an application of the brakes on the locomotive independently of the brakes on the train and for use in charging the signal pipe of a train, a check valve and strainer arrangement interposed in the piping between the reducing valve device and signal pipe, and a vent valve device for effecting an emergency reduction in brake pipe pressure.

It has heretofore been proposed to mount the automatic and independent brake valve devices on a pedestal adapted to be mounted on and secured to the floor of a locomotive cab and also to mount on this pedestal certain of the devices above enumerated and provide through the pedestal cored passages to provide the desired communications to the various devices mounted thereon.

In pedestal brake valve devices of the type just described, the pedestals are massive and heavy due to the metal required to form the cored passages, and the devices mounted on the pedestal project therefrom and are liable to become broken off or to interfere with the free movement past the pedestal structure on the part of the engineer or others. Further, in the manufacture of pedestals of the above type, in which a large number of passages are formed by coring, the loss of castings due to shifting of cores or otherwise during the process of molding, is greater than desired with a corresponding excessive cost of manufacture.

The principal object of the invention is to provide an improved, relatively light weight pedestal brake valve device in which the above objectionable features are eliminated.

According to the invention, the pedestal is made substantially in the form of a channel having on one end a base portion adapted to be secured to the floor of a locomotive cab or the like, and having on the other end a pad upon which the brake valve device is adapted to be mounted with a portion overhanging the space between the side walls of the channel, and beneath the overhanging portion of the brake valve device and within the channel and the general projected outline of the brake valve device are mounted, in so far as possible, all of the devices hereinbefore mentioned. Only those passages which are connected to the feed valve device and other devices mounted on the pedestal are cored through the pedestal, all passages which merely connect the brake valve device to the base being formed by the use of light weight pipe, which being disposed in the channel back of the devices mounted on the pedestal, is protected against being damaged or broken. By this construction, a relatively light weight and compact assembly of devices is obtained, the devices being so arranged that if desired, a cover may be secured to the pedestal covering the devices mounted on the pedestal without materially increasing the clearance lines of the assembly, and even without the cover, the arrangement of the devices is such as not to cause any material interference with the movement of the engineer in the cab, and further, the pedestal is relatively simple and, therefore, inexpensive to cast due to the small number of cored passages extending through the pedestal.

In the accompanying drawing, Fig. 1 is a front view of a pedestal brake valve device embodying the invention, with a portion of the cover plate broken away; Fig. 2 is a side view of the pedestal brake valve device shown in Fig. 1; Fig. 3 is a sectional view taken on the line 3—3 in Fig. 1; and Fig. 4 is an enlarged sectional view taken on the line 4—4 in Fig. 2.

As shown in the drawing, the pedestal brake valve device comprises a pedestal having a base portion 1 adapted to be secured to the floor 2 of a locomotive cab, an upright channel portion 3 formed integrally with and extending upwardly from the base portion 1, and a mounting pad 5 formed on the upper end of the channel portion 3, a boss 6 being provided on the back of the pedestal adjacent the mounting pad 5. A stud is screwed into the boss 6 for anchoring the upper end of the pedestal to some fixed portion of the locomotive such as a bracket (not shown) which may be secured to the locomotive boiler.

The pedestal shown in the drawing for the purpose of illustrating an application of the invention, is preferably of the sloping or leaning type, that is, the type in which the pedestal is formed at a slight angle to the vertical, so as to substantially follow the contour of the boiler in the locomotive cab and thereby conserve valuable space.

An engineer's automatic brake valve device 8 is mounted on the pad 5 and secured thereto by bolts 9 and is so arranged with respect to said pad that the back or right hand side of said brake valve device, as viewed in Fig. 2, is inside the outer surface of the anchor boss 6, while the front or left hand side of said brake valve, as viewed in Fig. 2, extends out over the channel 3, thereby providing an overhanging portion 37, to the underside of which and within the projected outlines of said brake valve device, is secured a brake pipe discharge valve and maintaining valve mechanism 10 by means of bolts 11. By this construction, when the brake valve device 8 is removed from pad 5 for inspection or repairs, the mechanism 10 being carried by said brake valve device is also removed so as to better ensure adequate maintenance of said mechanism.

An independent brake valve device 12 is secured to one end of a bracket 13 which is screwed to the automatic brake valve device 8 by means of studs 14.

The channel portion 3 of the pedestal comprises a back, one portion of which is in the form of a relatively thin web 15, while the other portion 21 is thickened as shown in Fig. 3, and through the thickened portion 21 there are provided, by coring, several passages 22 which connect to cavities (not shown) in the pad 5 and which lead to cavities (not shown) in the base 1. The channel portion 3 of the pedestal further comprises side portions or strengthening webs 16 and 17.

Mounted on the thickened portion 21 of the back of the channel and between the sides 16 and 17 of the channel are a feed valve device 18, and a device 19 comprising a brake pipe vent valve device, and a strainer and check valve construction through which fluid under pressure is adapted to be supplied from the usual reducing valve device to the signal pipe of a passenger train. A reducing valve device 20 is mounted on the upper face of the pedestal base 1 and is disposed between the side walls 16 and 17 of channel 3.

The cored passages 22 in the pedestal preferably are only those passages which require branch passages, such as the passages which connect to the feed valve device 18, the device 19 and the reducing valve device 20, the casing being broken away in Fig. 3 to show the branch passages which lead to the feed valve device 18. All passages which connect to the brake valve devices 8 and 12 and extend directly to the base 1 without any branch passages, such as are provided from passages 22 to the devices just mentioned, are provided for by the use of light weight copper pipes 23. These pipes are adapted to be connected to the pad 5 and base 1 by means of a special union connection 24 and the pipes are disposed in the space between the web portion 15 of the channel and the rear faces of the combined brake pipe discharge valve and maintaining valve mechanism 10, the feed valve device 18 and the reducing valve device 20. It will now be noted that only the passages 22 are provided through the pedestal between the base 1 and pad 5 by coring, all other passages establishing communications between said pad and base being provided by the pipes 23 which are relatively light in weight as compared to the metal required to form cored passages 22, and since the pipes are placed in a location in which they are protected against damage and breakage they are just as effective and as satisfactory as cored passages.

It will further be noted that due to the channel shape of the pedestal adequate strength to prevent breakage is obtained, and this channel in the pedestal, and more particularly the overhanging portion 37 of the brake valve device, provides for such mounting of the various valve devices on the pedestal as to be substantially contained within a space defined by the contour of the brake valve device 8 projected at an angle equal to the slope of the pedestal. The various valve devices mounted on the pedestal are thereby well protected against being broken off or otherwise becoming damaged, and reduces to a minimum, interference with the movement of the engineer around the cab in the locomotive.

All of the devices mounted on the pedestal are readily accessible for removal or inspection and adequate hand room is provided around the feed valve device 18 and reducing valve device 20 to permit access of the engineer's hand to adjust said devices when necessary.

If desired, a cover 25 may be applied to the pedestal for enclosing the devices mounted on the pedestal to prevent said devices from becoming covered with dirt, and to provide a smooth contour at the outside of the pedestal and thereby improve the appearance of the assembly.

The cover 25 is so shaped as to extend around the valve devices 18, 19 and 20 mounted on the pedestal and the device 10 suspended from the bottom face of the brake valve device 8 and to lap over, to a slight extent, the sides 16 and 17 of the channel. The upper end of the cover 25 laps over the lower portion of the brake valve device 8, while the lower end of the cover laps over the edge of the pedestal base 1. The cover is supported vertically by a foot 26 which rests on the upper face of the base 1. This foot may be made from a section of angle iron with one side welded or otherwise secured to the cover 25. The cover is adapted to be secured in place by means of spring pressed latches, one of which is secured to each of the sides 16 and 17 of the channel by means of a bolt 28.

As shown in Fig. 4, each of the latches comprises a tubular member 29 having on one end a hook 30 adapted to hook into an opening 31 in the cover 25. A bracket 32 is carried by bolt 28 and pivotally connected to the outer end of said bracket is a rod 33 which extends through a suitable opening in the closed end of member 29, and which is provided within member 29 with an enlarged portion or head 34. A spring 35 is interposed between the head 34 and the closed end wall of member 29 and acts to pull the hook 30 against the cover 25 for holding said cover in place. Finger pieces 36 are provided on opposite sides of the tubular member 29, whereby with the hand said member may be moved against the pressure of spring 35 to release hook 30 from cover 25 when it is desired to remove the cover 25.

It will now be noted that according to the invention, a relatively simple, compact and light weight pedestal is provided and the various valve devices associated therewith are so arranged as to form a neat appearing assembly in which the devices are well protected against becoming damaged, and do not protrude to such an extent as to interfere with free movement of the engineer in and about the locomotive cab, while at the same time said devices are readily accessible for adjustment, inspection, removal and repairs.

The operation and function of the devices above described and the construction of various details of certain of said devices are covered in the patent of Clyde C. Farmer, No. 1,975,264, issued October 2, 1934, and my pending applications Serial No. 740,203, filed August 17, 1934, Serial No. 745,083, filed September 22, 1924, and Serial No. 747,731, filed October 10, 1934, and since the present invention does not relate to such operation and functions as covered by these pending applications, it is not deemed essential to a full understanding of the invention to provide further description thereof.

While one illustrative embodiment of the invention has been described in detail, it is not my intention to limit its scope to this embodiment or otherwise than by the terms of the appended claims.

Having now described my invention, what I claim as new and desire to secure by Letters Patent, is:

1. In a fluid pressure brake, in combination, a pedestal adapted to be mounted on the floor of a vehicle, a brake valve device secured to an upwardly facing surface of said pedestal and having an overhanging downwardly facing surface, and a brake pipe discharge valve mechanism secured to said downwardly facing surface.

2. In a fluid pressure brake, the combination with a pedestal adapted to be mounted on the floor of the vehicle, of a brake valve device mounted on the upper end of said pedestal so that a portion of the brake valve device overhangs one side of the pedestal, and a brake pipe discharge valve mechanism secured to the underside of the overhanging portion of the brake valve device and removable as a unit from said brake valve device, and removable with said brake valve device upon removal of said brake valve device from said pedestal.

3. In a fluid pressure brake, the combination with a pedestal adapted to be mounted on the floor of the vehicle, of a brake valve device mounted on the upper end of said pedestal so that a portion of the brake valve device overhangs one side of the pedestal, and a plurality of valve devices mounted on said pedestal beneath the overhanging portion of said brake valve device and contained within a space defined by the contour of said brake valve device and extending substantially parallel to the general vertical direction of the pedestal.

4. In a fluid pressure brake, the combination with a pedestal having a base portion adapted to be mounted on the floor of a vehicle and an upright portion carried by said base portion, a brake valve device mounted on the upper end of said pedestal with a portion overhanging one side of said pedestal, a plurality of valve devices mounted on the upright portion of said pedestal beneath the overhanging portion of said brake valve device, a valve device mounted on the base portion of said pedestal substantially underneath the valve devices on the upright portion, the valve devices on the upright portion and base portion of said pedestal being disposed in a space defined substantially by the contour of said brake valve device projected substantially parallel to the general vertical direction of said pedestal.

5. In a fluid pressure brake, the combination with a pedestal having a base portion adapted to be secured to the floor of a locomotive cab, and an upright portion carried by said base portion and disposed at an angle to the vertical so as to substantially follow the contour of the boiler in the locomotive cab, said upright portion having a side adapted to face the boiler of the locomotive and having an opposite or front side, a brake valve device mounted on the upper end of the upright portion of said pedestal in such a manner that a portion projects beyond the front side of said pedestal, and a plurality of valve devices mounted on the front side of said pedestal within a space defined substantially by the contour of said brake valve device projected at the same angle to the vertical at which the upright portion of said pedestal is disposed.

6. In a fluid pressure brake, the combination with a brake valve device and another valve device, of a pedestal comprising a base portion adapted to be secured to the floor of a vehicle, an upright portion caried by the base portion, and a mounting pad on the upper end of said upright portion upon which said brake valve device is mounted, said upright portion being in the form of a channel, and the brake valve device being mounted on said pad portion so that a portion overhangs the space within the channel, said other valve device being secured to said upright portion within the channel and underneath the overhanging portion of said brake valve device.

7. In a fluid pressure brake, the combination with a brake valve device and another valve device, of a pedestal comprising a base portion adapted to be secured to the floor of a vehicle, an upright portion carried by the base portion, and a mounting pad on the upper end of said upright portion upon which said brake valve device is mounted, said other valve device being secured to a face of said upright portion of said pedestal, said pedestal having passageways back of said face formed by coring and adapted to connect to said other valve device and adapted to extend from said base portion to said pad portion and thereby establish a communication to said brake valve device, a plurality of pipes one end of each of which is secured in said base portion while the other end of each is secured in said pad portion, said pipes providing corresponding passageways between said base portion and said pad portion.

8. In a fluid pressure brake, the combination with a brake valve device and another valve device, of a pedestal having a base portion adapted to be mounted on the floor of a vehicle, an upright portion carried by said base portion, and a mounting pad carried by the upper end of said upright portion upon which said brake valve device is mounted, said other valve device being carried on a face of the upright portion, said pedestal having a plurality of passageways adapted to establish communications from the base portion to the pad portion and thereby to said brake valve device, one of said passageways being adapted to lead to said other valve device and being formed by coring through the pedestal, the other passageways connecting the base portion, only and directly to said pad portion, being formed by light weight pipes having one end secured in the base portion and the other end secured in the pad portion.

9. In a fluid pressure brake, the combination with a brake valve device and another valve device, of a pedestal comprising a base portion adapted to be secured to the floor of a vehicle, an upright portion caried by the base portion and upon which said other valve device is mounted, and a pad portion on the upper end of said upright portion upon which said brake valve device is mounted, said pedestal being in the form of a channel, a longitudinally extending portion disposed interiorly and at one side of said channel and provided with a cored passageway adapted to establish a communication from said base portion to said pad portion and thereby said brake valve device, said passageway having a branch leading to said other valve device, and a plurality of pipes establishing communications from said base portion to said pad portion, one end of each of said plurality of pipes being secured in said base portion, while the other end of each is secured in said pad portion.

10. In a fluid pressure brake, the combination with a brake valve device and another valve device, of a pedestal comprising a base portion adapted to be mounted on the floor of a vehicle, an upright portion carried by said base portion, and a mounting pad on the upper end of said upright portion upon which said brake valve is adapted to be mounted, said upright portion being in the form of a channel, one portion of the back of which is in the form of a relatively thin web, while an adjacent portion is thickened, upon which thickened portion said other valve device is mounted, said thickened portion having a cored passage leading to said valve device and adapted to lead to said brake valve device, and a plurality of pipes disposed within said channel in front of the web portion thereof and adapted to establish communications from said base portion to said pad portion and thereby to said brake valve device, said pipes having one end secured in said base portion and the other end secured in said pad portion.

11. In a fluid pressure brake, the combination with a brake valve device and another valve device, of a pedestal comprising a base portion adapted to be mounted on the floor of a vehicle, an upright portion carried by said base portion, and a mounting pad on the upper end of said upright portion upon which said brake valve is adapted to be mounted, said upright portion being in the form of a channel, one portion of the back of which is in the form of a relatively thin web, while an adjacent portion is thickened, upon which thickened portion said other valve device is mounted, said thickened portion having a cored passage leading to said valve device and adapted to lead to said brake valve device and base portion, and a plurality of pipes disposed within said channel in front of the web portion, thereof and adapted to establish communications from said base portion to said pad portion and thereby to said brake valve device, said pipes having one end secured in said base portion and the other end secured in said pad portion.

12. In a fluid pressure brake, the combination with a brake valve device and another valve device, of a pedestal comprising a base portion adapted to be mounted on the floor of a vehicle, an upright portion carried by said base portion and a mounting pad on the upper end of said upright portion upon which said brake valve is adapted to be mounted, said upright portion being in the form of a channel, one portion of the back of which is in the form of a relatively thin web, while an adjacent portion is thickened, upon which thickened portion said other valve device is mounted, said thickened portion having a cored passage leading to said valve device and adapted to lead to said base portion, and a plurality of pipes disposed within said channel in front of the web portion thereof and adapted to establish communications from said base portion to said pad portion and thereby to said brake valve device, said pipes having one end secured in said base portion and the other end secured in said pad portion.

13. In a fluid pressure brake, the combination with a pedestal comprising a base portion, an upright portion carried by said base portion, and a mounting pad on said upright portion, a brake valve device mounted on said mounting pad, said upright portion being in the form of a channel a portion of the bottom of which is in the form of a relatively thin web while an adjacent portion is thickened, a plurality of passages, formed by coring, in the thickened portion of the channel, a plurality of valve devices secured to said thickened portion within said channel and adapted to be in communication with said passages, and a plurality of pipes disposed in said channel in front of said web portion and back of said valve devices and adapted to establish communications from said base portion to said pad portion and thereby said brake valve devices, said pipes having one end secured to said base portion and the other end secured to said pad portion.

14. In a fluid pressure brake, the combination with a pedestal comprising a base portion, an upright portion carried by said base portion, and a mounting pad on said upright portion, a brake valve device mounted on said mounting pad, a plurality of valve devices mounted on said upright portion, said pedestal having a plurality of communications, some of which are adapted to lead from said base portion to said pad portion and thereby said brake valve device, and others of which are adapted to connect to certain of said plurality of valve devices and lead either to said base portion or pad portion or both portions, the communications leading to said plurality of valve devices being formed in said pedestal by coring in the process of manufacture, and relatively light weight pipes forming all other communications, one end of each of said pipes being secured to said base portion while the other end of each of said pipes is secured to said pad portion.

15. In a fluid pressure brake, the combination with a pedestal comprising a base portion, a channel shaped upright portion and a pad portion on the upper end of said upright portion, a brake valve device mounted on said pad portion with a portion overhanging the space within said channel, a portion of the back wall of the channel portion being in the form of a web and another portion being thickened, a plurality of valve devices mounted on the thickened portion of said channel below the overhanging portion of said brake valve device and within a space defined substantially by the contour of said brake valve device projected substantially parallel to the general vertical direction of said pedestal, the thickened portion of the channel shaped upright portion of said pedestal having a plurality of passageways adapted to establish communications to said plurality of valve devices, and a plurality of relatively light weight pipes disposed within said channel portion in front of the web portion thereof and to the rear of said valve devices and adapted to establish communications from said base portion to said pad portion and thereby said brake valve device, said pipes having one end secured to said base portion and the other end secured to said pad portion.

16. In a fluid pressure brake, the combination with a pedestal having a base portion mounted on the floor of a vehicle, an upright portion carried by said base portion, and a mounting pad on the upper end of said upright portion, a brake valve device disposed on said mounting pad with a portion overhanging one side of the upright portion of said pedestal, a plurality of valve devices mounted on said pedestal below the overhanging portion of said brake valve device, a cover fitted around said valve devices, and latches for securing said cover to said pedestal.

17. In a fluid pressure brake, the combination with a pedestal having a base portion mounted on the floor of a vehicle, an upright portion carried by said base portion, and a mounting pad on the upper end of said upright portion, a brake valve device disposed on said mounting pad with a portion overhanging one side of the upright portion of said pedestal, a plurality of valve devices mounted on said pedestal below the overhanging portion of said brake valve device and within a space defined by the outline of said brake valve device projected substantially parallel to the general vertical direction of said pedestal, a cover fitted over said valve devices with the sides of the cover lapping over the sides of the upright portion of the pedestal, the top of the cover lapping over the overhanging portion of said brake valve device and the bottom of the cover lapping over the base portion of the pedestal, means for supporting said cover vertically, and latches for securing said cover to said pedestal.

ELLIS E. HEWITT.